US008972843B2

(12) United States Patent
Rees et al.

(10) Patent No.: US 8,972,843 B2
(45) Date of Patent: Mar. 3, 2015

(54) SENDING A SUBSET OF COMPONENT DOCUMENTS OF A MODULAR DOCUMENT TO AN ELECTRONIC DEVICE

(75) Inventors: Robert Thomas Owen Rees, Newport (GB); Roger Brian Gimson, Bristol (GB); Helen Balinsky, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1419 days.

(21) Appl. No.: 12/511,507

(22) Filed: Jul. 29, 2009

(65) Prior Publication Data

US 2011/0029851 A1 Feb. 3, 2011

(51) Int. Cl.
*G06F 17/00* (2006.01)
*G06F 17/30* (2006.01)

(52) U.S. Cl.
CPC .................................. *G06F 17/30174* (2013.01)
USPC ........... 715/209; 715/200; 715/234; 715/255; 709/204; 709/205; 707/E17.061

(58) Field of Classification Search
USPC ........... 715/209, 234, 255, 200; 709/204, 205
See application file for complete search history.

(56) References Cited

U.S. PATENT DOCUMENTS

| | | | | |
|---|---|---|---|---|
| 6,067,552 | A * | 5/2000 | Yu | 715/234 |
| 6,078,934 | A * | 6/2000 | Lahey et al. | 715/205 |
| 6,757,717 | B1 * | 6/2004 | Goldstein | 709/217 |
| 7,308,462 | B1 * | 12/2007 | Clarkson et al. | 1/1 |
| 7,720,890 | B2 | 5/2010 | Rao et al. | |
| 7,917,845 | B2 * | 3/2011 | Harrington | 715/234 |
| 8,233,777 | B2 * | 7/2012 | Seo | 386/332 |
| 8,335,754 | B2 * | 12/2012 | Dawson et al. | 706/45 |
| 2002/0013853 | A1 * | 1/2002 | Baber et al. | 709/232 |
| 2004/0216048 | A1 * | 10/2004 | Brown et al. | 715/530 |
| 2005/0268221 | A1 * | 12/2005 | Shur et al. | 715/513 |
| 2007/0255694 | A1 * | 11/2007 | Wu | 707/3 |
| 2007/0283241 | A1 | 12/2007 | Baldonado et al. | |
| 2008/0104493 | A1 | 5/2008 | Rees | |
| 2008/0104497 | A1 * | 5/2008 | Lumley et al. | 715/209 |
| 2008/0104504 | A1 * | 5/2008 | Gimson et al. | 715/234 |
| 2008/0104508 | A1 | 5/2008 | Lumley | |
| 2008/0229137 | A1 * | 9/2008 | Samuels et al. | 713/600 |
| 2009/0157811 | A1 * | 6/2009 | Bailor et al. | 709/204 |
| 2009/0172101 | A1 | 7/2009 | Arthursson | |
| 2010/0205148 | A1 | 8/2010 | Leblanc | |

(Continued)

OTHER PUBLICATIONS

XML Paper Specification, XPS Specification and Reference Guide, Sep. 2007, pp. 1-486 http://www.ecma-international.org/activities/XML%20Paper%20Specification/XPS%20Standard.pdf.*

(Continued)

*Primary Examiner* — Stephen Hong
*Assistant Examiner* — Mario M Velez-Lopez
(74) *Attorney, Agent, or Firm* — Dan Hu; Trop, Pruner & Hu

(57) ABSTRACT

To communicate a modular document from a first electronic device to a second electronic device, the first electronic device determines which one or more component documents of the modular document are already available at the second electronic device. The modular document is composed of plural component documents. The first electronic device sends to the second electronic device a subset of the plural component documents of the modular document, where the subset of the plural component documents is other than the one or more component documents already available at the second electronic device.

21 Claims, 3 Drawing Sheets

(56) References Cited

U.S. PATENT DOCUMENTS

2010/0318898 A1* 12/2010 Rees et al. .................. 715/236
2011/0029482 A1 2/2011 Gimson
2011/0125709 A1 5/2011 Pandya

OTHER PUBLICATIONS

XML Inclusion (XInclude) Version 1.0, Nov. 25, 2006, pp. 1-20, http://web.archive.org/web/20061125154706/http://www.w3.org/TR/xinclude/.*
U.S. Appl. No. 12/511,500, Non-Final Rejection dated Aug. 31, 2011, pp. 1-18 and attachments.
Lumley et al., U.S. Appl. No. 12/482,646 entitled "Updating Electronic Documents" filed Jun. 11, 2009, 21 pages.
Rees et al., U.S. Appl. No. 12/483,036 entitled "Rendering Definitions" filed Jun. 11, 2009, 25 pages.
Rees et al., U.S. Appl. No. 12/537,493 entitled "Providing an Access Mechanism Associated With a Document Part to Determine an Action to Take If Content of the Document Part Is Inaccessible" filed Aug. 7, 2009, 24 pages.
Gimson et al., U.S. Appl. No. 12/511,500 entitled "Synchronizing a Change of a Modular Document" filed Jul. 29, 2009, 23 pages.
Rees et al., U.S. Appl. No. 12/511,513 entitled "Merging Instances of a Modular Document" filed Jul. 29, 2009, 24 pages.
Gimson et al., U.S. Appl. No. 12/511,523 entitled "Associating Version Information With a Component Document of a Modular Document" filed Jul. 29, 2009, 25 pages.
U.S. Appl. No. 12/511,500, Final Rejection dated Feb. 3, 2012 (19 pages).
U.S. Appl. No. 12/511,500, Non-Final Rejection dated Nov. 23, 2012, pp. 1-17 and attachments.
U.S. Appl. No. 12/511,500, Non-Final Office Action dated Jun. 5, 2013, pp. 1-17 and attachments.
U.S. Appl. No. 12/511,500, Non-Final Office Action dated Sep. 20, 2013, pp. 1-17 and attachment.
U.S. Appl. No. 12/511,500, Final Rejection dated Apr. 23, 2014. pp. 1-13 and attachments.

* cited by examiner

SENDING A SUBSET OF COMPONENT DOCUMENTS OF A MODULAR DOCUMENT TO AN ELECTRONIC DEVICE

BACKGROUND

There are various mechanisms to transmit documents between different locations over a network. For example, a user may send a document as an attachment in an electronic mail to another user. Alternatively, a document can be uploaded or downloaded from one electronic device to another electronic device over a network.

Traditionally, a document is saved as a single, complete and self-contained file, where the single file can be transmitted from one location to another location. Word processor or other types of publishing systems are designed to operate on such isolated and self-contained documents, and such word processor or other publishing systems naturally support a mode of transmission where self-contained documents are transmitted between locations.

To achieve improved efficiency, documents can be designed to be modular, where a modular document is composed of separately identifiable component documents. Conventionally, efficient mechanisms have not been provided to exchange modular documents between locations over a network.

BRIEF DESCRIPTION OF THE DRAWINGS

Some embodiments of the invention are described with respect to the following figures.

DETAILED DESCRIPTION

Figure 1:
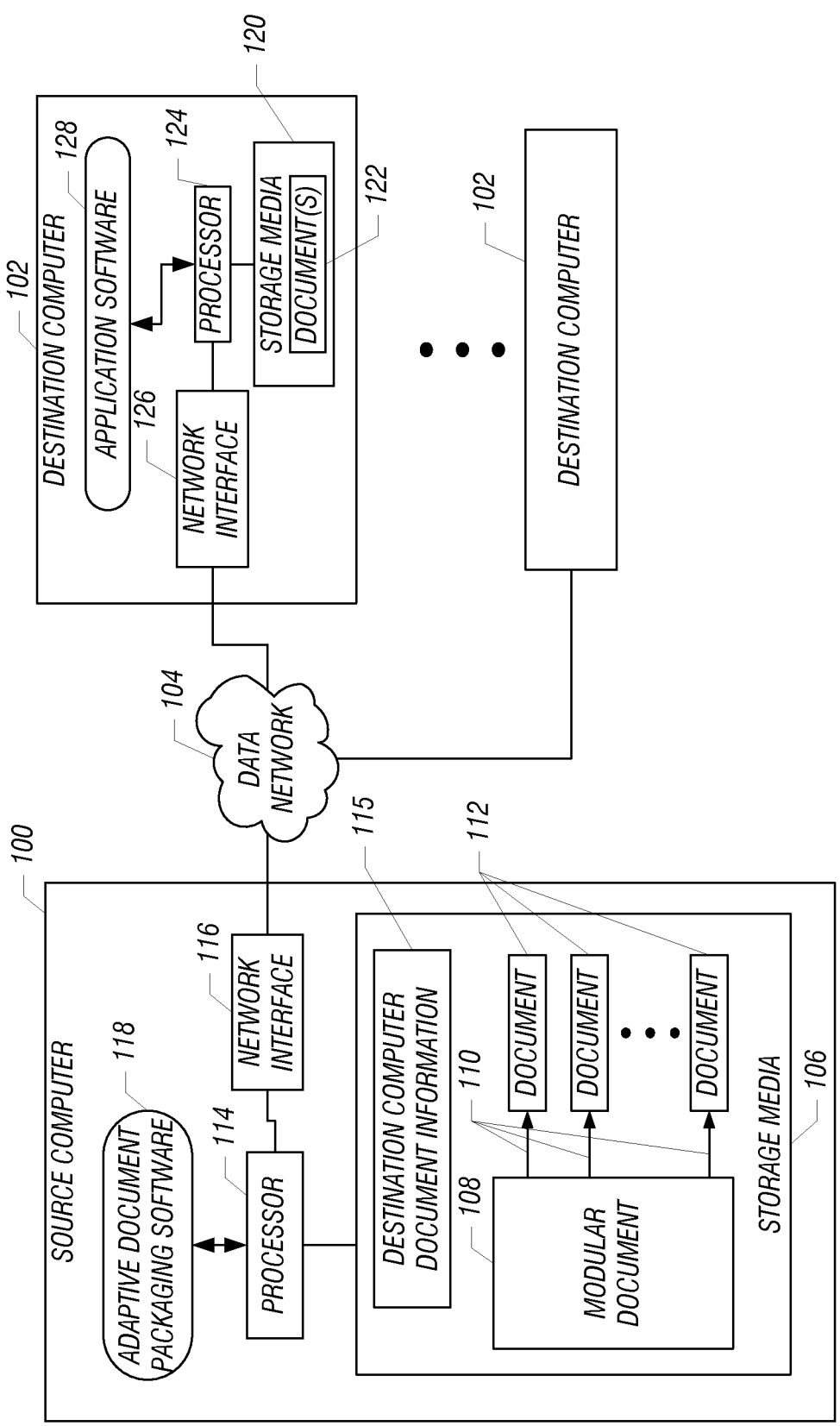
FIG. 1 is a block diagram of an exemplary arrangement that includes a source computer and destination computers, in which an embodiment of the invention can be incorporated.

In accordance with some embodiments, a mechanism is provided to enable efficient communication of modular documents between different locations over a network. A "modular document" refers to a document that is composed of separately identifiable component documents (in other words, each component document can be separately and independently accessed by another application or entity for other usage, such as to form another modular document). A "document" refers to a container of data that is identifiable.

The component documents of a source document are combined to allow for proper (or a target) presentation (e.g., viewing or listening) of the modular document. Combining of the component documents also achieves a target behavior of the modular document (e.g., load appropriate objects such as images or text, retrieve variable data from a selected source or sources, etc.). Some component documents can be shared by multiple modular documents, and any one of the component documents of a modular document can be modified or replaced. A modular document generally refers to any data structure container that has references to other documents that in combination make up the modular document.

A modular document can be a word processing document that contains two or more of the following component documents: a template, image document, text document, and so forth. Another example of a modular document is a web page that has two or more of the following component documents: HTML (Hypertext Markup Language) document, image document, script, style sheet, and so forth.

Communication of a modular document between a source location (e.g., source electronic device) and a destination location (e.g., destination electronic device) is associated with various issues. For a recipient (e.g., word processor or other publishing system) to properly handle a modular document, the receiving word processor or other publishing system has to receive the modular document along with its component documents. For the recipient to properly process the modular document, the recipient has to have access to the component documents that make up the modular document.

However, having to send all the component documents of a modular document each time the modular document is transmitted from a source electronic device to a destination electronic device may not be efficient, since the destination electronic device may already have access to some or all of the component documents. On the other hand, if all component documents of a modular document are not consistently sent, then the destination electronic device may not be able to retrieve one or more of the component documents of the modular document under certain scenarios such as when a network connection is unavailable or the location containing the desired component document(s) is temporarily unavailable.

In accordance with some embodiments, the mechanism that efficiently communicates modular documents between a source location and a destination location is able to send just component documents that the destination electronic device does not have, while at the same time ensuring or increasing the likelihood that the destination location is provided with all component documents of the modular document. In response to a request to communicate a modular document, the mechanism determines which component documents of the modular document are available at the destination electronic device. If one or more of the component documents of the modular document are already available at the destination electronic device, then the mechanism creates a package that contains a subset of the component documents of the modular document, where the subset includes component document(s) other than the one or more component documents that are already available at the destination electronic device. The package is then sent from the source electronic device to the destination electronic device. In this way, it is ensured that the destination electronic device has available all of the component documents of the modular document that is being communicated, while at the same time avoiding the transmission of component document(s) that already is available at the destination electronic device, which improves efficiency in usage of network bandwidth.

Examples of source and destination electronic devices include one or more of the following: desktop computers, notebook computers, server computers, personal digital assistants (PDAs), smart phones, gaming consoles, music/video players, or other types of electronic devices.

FIG. 1 is a block diagram of an exemplary arrangement that includes a source computer 100 (or other source electronic device) and one or more destination computers 102 (or other destination electronic devices) that are coupled over a data network 104 to the source computer 100. Examples of the data network 104 include any one or more of a local area network (LAN), a wide area network (WAN), the Internet, and so forth (whether wired or wireless).

The source computer 100 includes storage media 106, which can be implemented with one or more disk-based storage devices and/or one or more integrated circuit (IC) or semiconductor memory devices. As shown in the example in FIG. 1, the storage media 106 contains a modular document 108 that references 110 multiple component documents 112. Although just one modular document 108 is shown, it is noted that the storage media 106 can contain more than one modular document.

It is also noted that in some applications, at least one of the component documents 112 can itself be a modular document that references other component documents. Thus, generally, a first modular document can reference component documents, where it is possible that at least one of the component documents is a second modular document that in turn references additional component documents. Moreover, it is also possible that at least one of the additional component documents is a third modular document that references further component documents. This hierarchical referencing of modular documents can be performed to any depth.

The source computer 100 further includes a processor 114 connected to the storage media 106. The processor 114 is connected to a network interface 116 that allows the source computer 100 to communicate over the data network 104 with the destination computers 102.

In addition, the source computer 100 includes an adaptive document packaging software 118 that is executable on the processor 114. The adaptive document packaging software 118 is able to perform adaptive packaging of component documents of a modular document that is to be transmitted from the source computer 100 to the destination computer 102, where "adaptive packaging" refers to the process of identifying a subset of the component documents that are not already available at the destination computer 102.

As further shown in FIG. 1, a destination computer 102 includes a storage media 120 that contains one or more documents 122, which can be component documents of a modular document. The storage media 120 is connected to a processor 124, which is connected to a network interface 126 to allow the destination computer 102 to communicate over the data network 104. The destination computer 102 also includes application software 128 that is executable on the processor 124. The application software 128 can be a word processing software, a web browser, or any other software that is able to process and/or present modular documents.

Figures 2, 3:
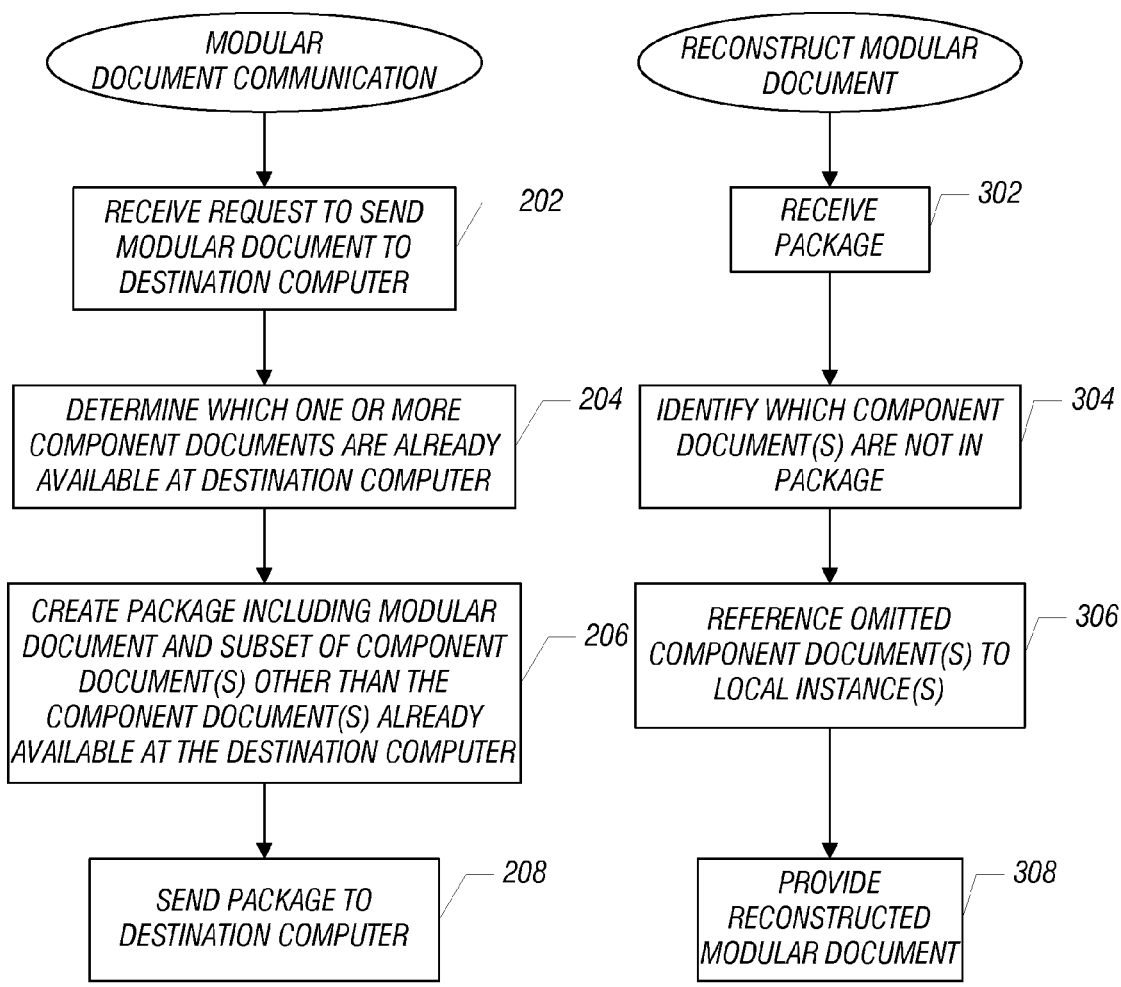
FIG. 2 is a flow diagram of performing modular document communication, according to an embodiment.
FIG. 3 is a flow diagram of reconstructing a modular document according to an embodiment.

FIG. 2 is a flow diagram of modular document communication according to an embodiment. The process of FIG. 2 can be performed by the adaptive document packaging software 118 in the source computer 100 of FIG. 1, according to an embodiment. The adaptive document packaging software 118 receives (at 202) a request to send a modular document to a destination computer 102. In response to the request, the adaptive document packaging software 118 determines (at 204) which one or more component documents of the modular document are already available at the destination computer 102.

Determining which one or more component documents are already available at the destination computer 102 can be performed using one of various techniques. For example, the adaptive document packaging software 118 can send a query to the destination computer 102 to identify which one or more component documents of the modular document are available at the destination computer. The query can include a full list of the component documents of the modular document. Upon receiving this list, the destination computer 102 can determine which of the component documents in the list is (are) already available at the destination computer, and can send back a response to the source computer 100 identifying which of the component documents in the list are already available at the destination computer. A component document is "available" at the destination computer 102 if the component document is stored in the storage media 120 of the destination computer 102, or is otherwise readily retrievable by the destination computer 102 from some location (whether internal or external to the destination computer 102).

In an alternative implementation, determining whether the destination computer has one or more component documents of the modular document can be based on historical information, which can be maintained as destination computer document information 115 stored in the storage media 106 of the source computer 100 (FIG. 1). The historical information may indicate which modular documents have previously been communicated between the source computer 100 and the destination computer 102. The source computer 100 is aware of the component documents of these modular documents, and can identify the shared component documents between these prior modular documents and the present modular document that is to be communicated. The shared component documents are the documents that are already available at the destination computer 102.

More generally, the source computer 100 can monitor communications between the source computer 100 and the destination computer 102. This history of communications identifies documents that have been communicated between the source computer 100 and the destination computer 102. From this historical information, the source computer 100 can readily determine what component documents are already available at the destination computer 102. In some embodiments, the source computer 100 can also maintain a document retention policy of each destination computer 102. The document retention policy specifies the policy for retaining documents at the corresponding destination computer 102. For example, the document retention policy may specify that documents older than some predefined age are discarded. Determining whether or not a document is available at a destination computer can further be based on the document retention policy of the destination computer 102. For example, if the source computer 100 determines from historical information that a particular document was sent to a destination computer 102 two weeks ago, but the document retention policy specifies that the destination computer 102 is to discard documents older than one week old, then the source computer 100 will determine that the particular document would no longer be available at the destination computer 102.

As further shown in FIG. 2, the adaptive document packaging software 118 creates (at 206) a package of a subset of component document(s) other than the component document(s) already available at the destination computer 102. The created package also includes the modular document that references the component documents. The package is then sent (at 208) from the source computer 100 to the destination computer 102.

FIG. 3 illustrates a process of reconstructing a modular document at the destination computer 102, according to an embodiment. The destination computer 102 receives (at 302) the package that was sent by the source computer 100, where the package includes the modular document and a subset of component document(s). The modular document that is in the package contains references to component documents of the modular document. The references in some embodiments contain unique identifiers of the component documents. The use of unique identifiers allows for global identification of the component documents across multiple electronic devices of a network.

The destination computer 102 identifies (at 304) which component document(s) are not in the received package. The destination computer 102 references (at 306) any such omitted component document(s) to local instance(s) of the component document(s). A local instance of a component document refers to an instance of the component document that is available to the destination computer 102, where such instance of the component document can be stored in a local storage media of the destination computer 102 or is otherwise readily accessible by the destination computer 102. The reconstructed modular document that includes component document(s) in the received package as well as local instance(s) of component document(s) omitted from the received package is then provided (at 308). "Providing" the reconstructed modular document includes presenting the modular document (such as by displaying the modular document or otherwise presenting the modular document to a user), saving the modular document, or forwarding the modular document to another location.

Figure 4:
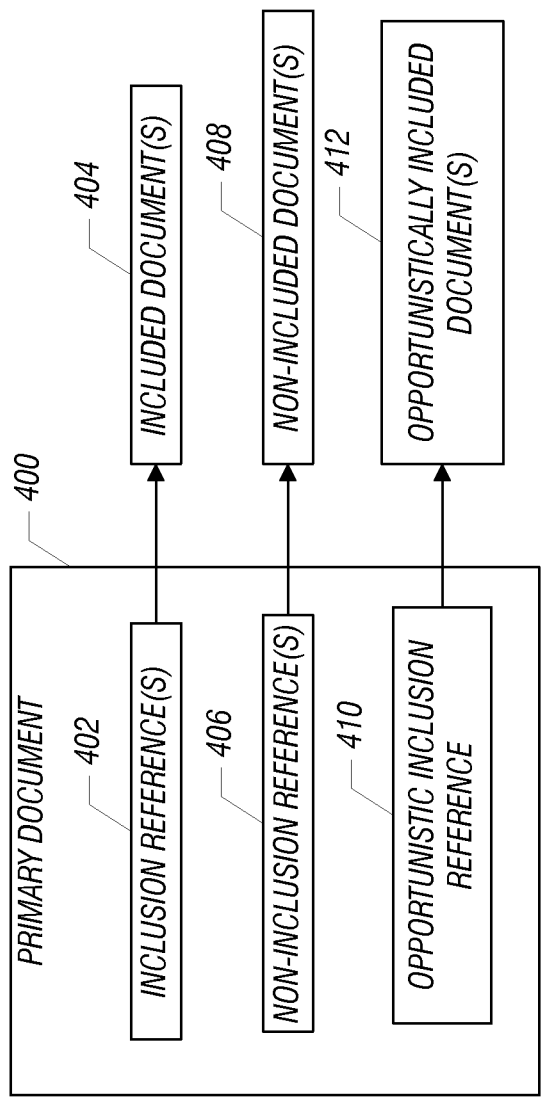
FIG. 4 illustrates a primary document that references component documents, according to an exemplary embodiment.

In some embodiments, as shown in FIG. 4, a modular document can be made up of a primary document 400 and a number of component documents that are referenced by the primary document. The primary document 400 contains "inclusion" references 402 to the component documents that indicate that such component documents (referred to as "included" documents 404) are to be combined with the primary document to form a compound modular document. In general, the inclusion references 402 from the primary document 400 to included component documents 404 can form a graph linking all of the component documents that are to be obtained to form the overall compound document. This graph linking documents can be a tree-like graph (or other acyclic data structure) in which it is possible for component documents to be modular documents that reference other component documents that in turn can also be modular documents.

In addition to inclusion references 402 to component documents, the primary document 400 can also contain non-inclusion references 406 to other documents ("non-included documents" 408). These non-included documents 408 are documents that may be of some interest to the consumer of the modular document, but such non-included documents do not have to be combined with the primary document to form the overall modular document. Non-included documents 408 are not provided in the package that is sent from the source computer 100 to the destination computer 102 for communication of the modular document.

Another type of reference that can be included in the primary document is an opportunistic inclusion reference 410. A document 412 that is the subject of an opportunistic inclusion reference is a document that if available would be combined with the primary document to form the overall modular document. However, if the opportunistically included document 412 is not available, then such document would not be combined with the primary document. In accordance with some embodiments, opportunistically included documents 412 are not provided in the package that is sent from the source computer 100 to the destination computer 102. However, at the destination computer 102, even if the opportunistically included document is not part of the received package, the destination computer 102 can nevertheless retrieve the opportunistically included document, if locally available, for combination with the primary document to form the overall modular document.

In alternative embodiments, whether or not an opportunistically included document is included in the package sent from the source computer 100 to the destination computer 102 depends upon policy that is set at the source computer 100. For example, the policy can be a policy to minimize traffic, in which case opportunistically included documents are not transmitted with a package for a modular document. On the other hand, a policy may specify that opportunistically included documents are to be sent in a package when a modular document is to be communicated.

Instructions of software described above (including the adaptive document packaging software 118 and application software 128 of FIG. 1) are loaded for execution on a processor (such as processor 114 and 124 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one or more CPUs in one or more computers or other electronic devices).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of communicating a modular document from a first electronic device to a second electronic device, comprising:
   determining, by the first electronic device, which one or more component documents of the modular document are already available at the second electronic device, wherein the modular document is composed of plural component documents; and
   creating, by the first electronic device, a package that includes the modular document and a subset of the plural component documents of the modular document, wherein the subset of the plural component documents is other than the one or more component documents already available at the second electronic device, wherein the modular document in the package includes references to the plural component documents, and wherein the first electronic device does not include in the package the one or more component documents determined by the first electronic device to be already available at the second electronic device; and sending, by the first electronic device to the second electronic device, the package.

2. The method of claim 1, wherein determining which one or more component documents of the modular document are already available at the second electronic device comprises querying the second electronic device to identify which one or more component documents of the modular document are available at the second electronic device, the method further comprising identifying the subset to include in the package based on a response to the querying, the response received by the first electronic device from the second electronic device.

3. The method of claim 1, wherein the modular document is a first modular document, wherein determining which one or more component documents of the modular document are already available at the second electronic device comprises:
   determining whether a second modular document has been sent to the second electronic device;
   determining which one or more component documents of the first modular document are shared with the second modular document; and
   identify the shared one or more component documents as the one or more component documents of the first modular document already available at the second electronic device.

4. The method of claim 1, wherein determining which one or more component documents of the modular document are already available at the second electronic device comprises:
   maintaining historical information of communications with the second electronic device; and
   accessing the historical information to determine which one or more component documents of the first modular document are already available at the second electronic device.

5. The method of claim 4, wherein determining which one or more component documents of the modular document are already available at the second electronic device is further based on accessing a document retention policy of the second electronic device, wherein the document retention policy specifies discarding of documents older than a specified age.

6. The method of claim 1, wherein the modular document includes a primary document that has inclusion references to the plural component documents, the inclusion references to the plural component documents including reference to the one or more component documents determined not included in the package.

7. The method of claim 1, wherein at least one of the plural component documents is a second modular document composed of plural additional component documents, wherein the subset includes one or more of the additional component documents.

8. The method of claim 1, further comprising:
   identifying references in the modular document to included documents and at least one reference to a non-included document, wherein the subset includes one or more of the included documents but not the non-included document.

9. The method of claim 1, further comprising:
   identifying references in the modular document to included documents and at least one reference to an opportunistically included document, wherein the subset includes one or more of the included documents; and
   deciding whether or not to add the opportunistically included document into the subset based on a policy at the first electronic device.

10. The method of claim 1, wherein the references to the plural component documents include one or more references to the one or more component documents not included in the package.

11. A source electronic device comprising:
   a storage media to store a modular document, wherein the modular document comprises plural component documents; and
   a processor to:
      receive a request to send the modular document to a destination electronic device;
      in response to the request, determine which of the plural component documents is already available at the destination electronic device; and
      prepare a package to send to the destination electronic device, wherein the package includes the modular document and a subset of the plural component documents not already available at the destination electronic device, the modular document in the package including references to the plural component documents, and wherein the processor is to not include in the package one or more component documents determined to be already available at the destination electronic device.

12. The source electronic device of claim 11, wherein the plural component documents are combined to allow for proper presentation of the modular document.

13. The source electronic device of claim 11, wherein the processor is to determine which of the plural component documents is already available at the destination electronic device by sending a list of the plural component documents to the destination electronic device and receiving a response from the destination electronic device regarding which one or more component documents are already available at the destination electronic device, and wherein the processor is to identify the subset to include in the package based on the response.

14. The source electronic device of claim 11, wherein the processor is to determine which of the plural component documents is already available at the destination electronic device by maintaining historical information of document communications with the destination electronic device.

15. The source electronic device of claim 11, wherein the modular document includes a primary document that has inclusion references to the plural component documents, and at least one non-inclusion reference to a non-included document, wherein the package does not include the non-included document.

16. The source electronic device of claim 11, wherein each of the modular document and the plural component documents is identified by a corresponding unique identifier.

17. The source electronic device of claim 11,
   wherein the processor is to further send the package to the destination electronic device in response to the request.

18. The source electronic device of claim 11, wherein the references to the plural component documents include one or more references to the one or more component documents not included in the package.

19. An article comprising at least one non-transitory computer-readable storage medium containing instructions that upon execution cause a destination electronic device to:
   receive, from a source electronic device, a package that includes a modular document and one or more component documents, wherein the modular document includes references to plural component documents, and wherein the package includes less than the plural component documents;

identify which of the plural component documents are missing from the package; and locally access the missing component documents to reconstruct the modular document at the destination electronic device.

20. The article of claim 19, wherein the instructions upon execution cause the destination electronic device to further present the modular document based on the plural component documents.

21. The article of claim 19, wherein the package is without the missing component documents that were identified by the source electronic device to already be available at the destination electronic device.

\* \* \* \* \*